Jan. 19, 1932.  C. J. ANDREWS  1,841,516
NURSING BOTTLE
Filed April 17, 1928
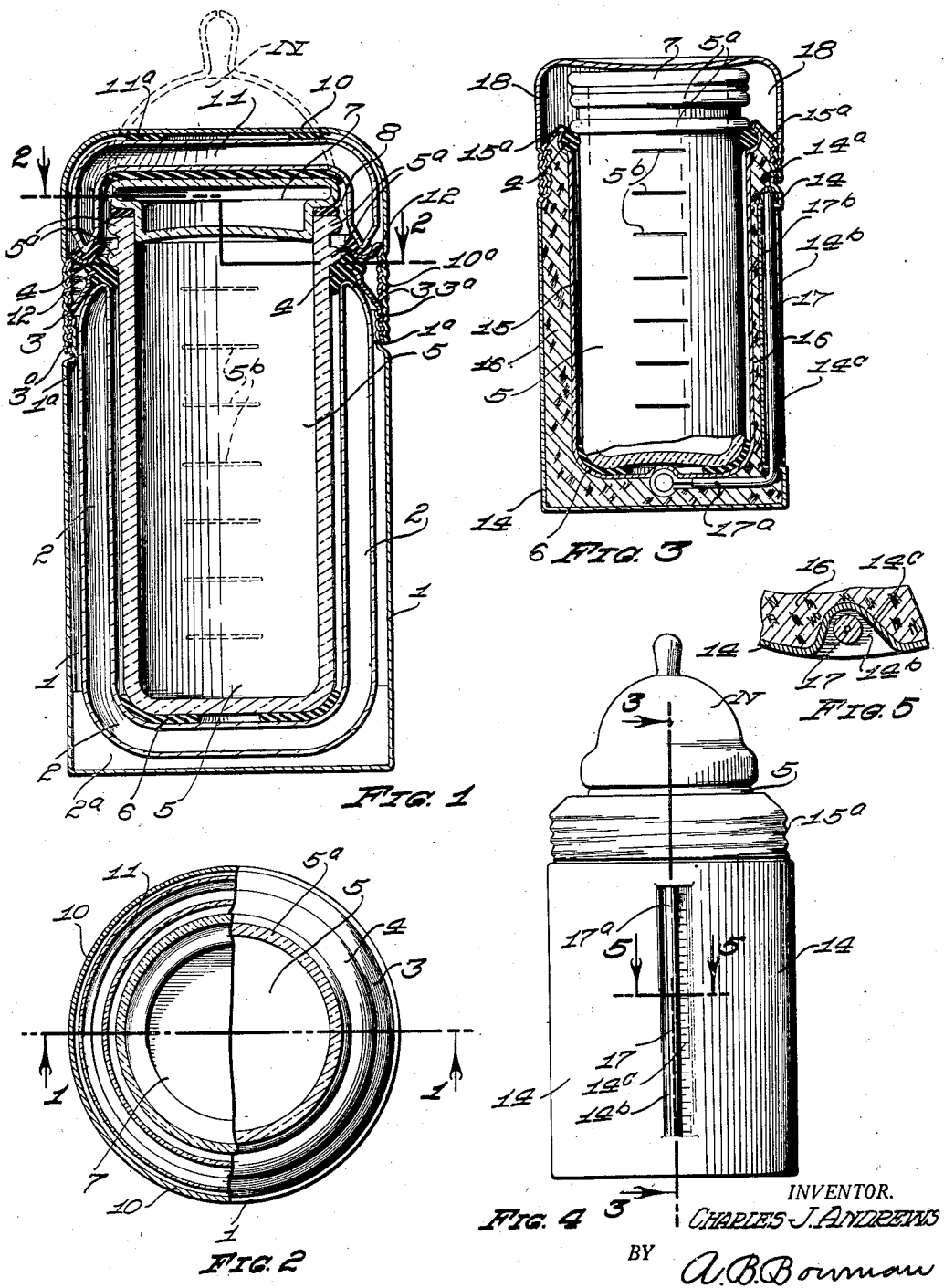
INVENTOR.
CHARLES J. ANDREWS
BY
A. B. Bowman
ATTORNEY Patented Jan. 19, 1932

1,841,516

UNITED STATES PATENT OFFICE

CHARLES J. ANDREWS, OF SAN DIEGO, CALIFORNIA

NURSING BOTTLE

Application filed April 17, 1928. Serial No. 270,616.

My invention relates to nursing bottles, and the objects of my invention are: First, to provide a nursing bottle in which a wide mouthed bottle portion may be readily removed from the bottle container portion for cleaning, filling or inspecting to determine the amount of liquid therein; Second, to provide a device of this class in which the bottle container portion is a heat insulating cell; Third, to provide a device of this class in which a conventional, wide mouthed, nursing bottle nipple may be used in connection therewith; Fourth, to provide a device of this class in which the bottle portion is insulated against the escape of heat by a container portion and cap member therefor; Fifth, to provide a device of this class in which a thermometer for determining the temperature of a liquid within the bottle portion is mounted in a readily visible and protected position in the container portion; Sixth, to provide a device of this class which will maintain milk or other liquid therein at the proper temperature for a considerable length of time; and Seventh, to provide a nursing bottle of this class which is simple of construction, proportionate to its function, durable, easily cleaned, sanitary, efficient, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a longitudinal sectional view through 1—1 of Fig. 2, showing my nursing bottle in its one form and showing by dotted lines the nipple in the position it would occupy if the container cap was removed and the bottle ready for use; Fig. 2 is a transverse sectional view through 2—2 of Fig. 1 with the cover shown in section and fragmentarily; Figs. 3, 4 and 5 illustrate a slight modification of my nursing bottle, of which Fig. 3 is a longitudinal sectional view through 3—3 of Fig. 4 with the nipple removed and the bottle cap in place and the bottle portion and other portions shown in elevation to facilitate the illustration; Fig. 4 is a side elevational view of my nursing bottle with the nipple positioned thereon and omitting the cap; and Fig. 5 is an enlarged fragmentary transverse sectional view through 5—5 of Fig. 4.

Similar characters of reference refer to similar parts and portions throughout the several views of the drawings.

The container casing 1, container thermos unit 2, collar member 3, container gasket 4, bottle member 5, bottle cushion 6, stopper member 7, sealing gasket 8, stopper cushion 9, cover casing 10, cover thermos unit 11, cover retaining ring 12, and cover gasket 13 constitute the principal parts and portions of the one structure of my nursing bottle. The outer shell 14, inner shell 15, heat insulating material 16, thermometer 17, and cover 18, constitute the principal parts and portions of my modified structure.

The container casing 1 is cylindrical in cross section, closed at its lower end and threaded at its upper portion. A thermos unit 2 is mounted within the casing 1 and spaced apart therefrom by means of spacer members 2a. It is held in position by means of a collar member 3 which is screwed over the threaded portion in the upper end of the casing 1.

A bottle member 5 is provided which has a pair of annular ridges 5a around the upper portion thereof forming a groove therebetween for accommodating a conventional wide mouthed nursing bottle nipple N, as shown by dotted lines in Fig. 1 of the drawings. A plurality of ridges 5b or other scale means are provided on the one side of the bottle member for facilitating the determination of the amount of liquid therein. The lower portion of the bottle 5 is spaced apart from the thermos unit by means of a cushion 6, while the upper portion of the bottle is held in spaced relation to the thermos unit by means of the gasket 4. A stopper member 7 is provided which fits into the open upper end of the bottle 5 and is provided with a sealing gasket 8 which seals the joint between the stopper and the bottle when said stopper is in position. Obviously the stopper may be made hollow if desired and the air may be excluded in order to make the stopper suitable for heat insulation. The threads 1a in the casing 1 and 3a in the collar member 3 are preferably pressed into the material thereby forming threads on the outer surface of the collar member 3. The threads 10a of the cover casing 10 fit the outer threads of the collar 3. A cover thermos unit 11 is mounted within the cover 10 and is spaced apart therefrom by means of a spacer member 11a. Said thermos unit is held in place by means of a retaining ring 12 which screws into the inner threads 10a which are pressed into the cover 10. A cover gasket 13 fills the juncture between the cover thermos unit 11 and the retaining ring 12, as shown in Fig. 1 of the drawings. The bottle 5 is made with straight sides as is the container thermos unit 2, thus the bottle may be readily withdrawn or partially withdrawn for inspection, cleaning or filling.

The cap 10 maintains the stopper 7 in position and prevents the leakage of fluid out of the bottle. By removing the cap 10 and the stopper member 7 the nursing nipple N may be placed on the nursing bottle without removing the bottle portion from its container, as shown by dotted lines in Fig. 1 of the drawings, thus the milk or other fluid may be kept at approximately constant temperature for a considerable length of time.

In the modification shown in Fig. 3, the nursing bottle and its cover are the same as shown in the other form of construction. The container consists of an outer shell 14, which is cylindrical in cross section and provided with a threaded portion 14a at its upper extremity; an inner shell 15 which is spaced apart from the outer shell and has a flanged upper portion 15a which screws onto the threaded portion 14a of the outer shell. Suitable insulating material 16 is placed between the two shells, as shown best in Fig. 3 of the drawings. A relatively deep channel 14b is provided in the outer shell 14. A thermometer 17 which is substantially L-shaped is provided, the shorter leg 17a of which is in as close contact with the bottle 5 as possible, as shown best in Fig. 3 of the drawings. The longer leg 17b extends into the channel portion 14b of the outer casing 14. Graduations 14c are provided either on the side of the channel 14b or on the thermometer itself. A cap or cover 18 fits over the juncture of the outer casing and the inner casing. Its upper portion or closed end has some resiliency and therefore holds the stopper member 7 in sealed position.

Though I have shown and described a particular construction, combination and arrangement of parts and portions, and a certain modification thereof, I do not wish to be limited to this particular construction, combination and arrangement nor to the modification, but desire to include in the scope of my invention the construction, combination and arrangement substantially as set forth in the appended claims.

Having thus described my invention, what I claim as new and desire to secure by Letters Patent is:

1. In a nursing bottle, a casing, a vacuum wall cell secured therein, a non-insulated nursing bottle member positioned in said vacuum wall cell and readily removable therefrom, a cover for said casing, a vacuum wall cover cell positioned in said cover, and a cushion for spacing said bottle from said vacuum wall cell.

2. In a nursing bottle, a casing, a vacuum wall cell secured therein, a nursing bottle member positioned in said vacuum wall cell and readily removable therefrom, a heat insulated stopper for said nursing bottle, and a cover member secured to said casing and having a resilient closed end for holding said stopper in its sealed position.

3. In a nursing bottle, a heat insulated container member, a readily removable bottle member positioned therein, a thermometer mounted in said container, the one portion thereof contiguous to and under the bottom of said bottle member, the other end portion mounted in visible position on the side of said container, a vacuum wall stopper for said bottle and cover means for maintaining said stopper in its sealed position.

4. In a nursing bottle, a container member comprising an outer casing, a heat insulating lining inside said outer casing, an inner casing, said inner casing having an indent in its lower end, an elongated depression in the outer casing having a perforation in the lower end thereof, a thermometer having a scale portion supported in said depression and extending through said perforation into said outer casing, and a bulb portion extending substantially at right angles to said scale portion and lying with its bulb in said indent in said inner casing, and a bottle member supported in said inner casing with its lower end substantially bearing on said indent.

In testimony whereof, I have hereunto set my hand at San Diego, California, this 7th day of April, 1928.

CHARLES J. ANDREWS.